United States Patent
Yamada et al.

(10) Patent No.: US 8,370,598 B2
(45) Date of Patent: Feb. 5, 2013

(54) STORAGE SYSTEM, COPY CONTROL METHOD, AND COPY CONTROL UNIT

(75) Inventors: Hidenori Yamada, Kawasaki (JP); Shin-ichi Nishizono, Kawasaki (JP); Hirotomo Tokoro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 434 days.

(21) Appl. No.: 12/489,148

(22) Filed: Jun. 22, 2009

(65) Prior Publication Data

US 2009/0327631 A1 Dec. 31, 2009

(30) Foreign Application Priority Data

Jun. 26, 2008 (JP) ................ 2008-167399

(51) Int. Cl.
*G06F 12/00* (2006.01)
*G06F 12/02* (2006.01)
*G06F 12/16* (2006.01)

(52) U.S. Cl. ............... 711/170; 711/162; 711/E12.001; 711/E12.002; 711/E12.103

(58) Field of Classification Search .................. 711/170, 711/162, E12.001, E12.002, E12.103
See application file for complete search history.

(56) References Cited

U.S. PATENT DOCUMENTS

| 2003/0229698 A1* | 12/2003 | Furuhashi et al. | ............ 709/226 |
| 2007/0143554 A1 | 6/2007 | Uchida et al. | |
| 2007/0294495 A1 | 12/2007 | Uchida et al. | |
| 2008/0052478 A1* | 2/2008 | Kubo et al. | ................... 711/162 |

FOREIGN PATENT DOCUMENTS

| JP | 63-004475 | 1/1988 |
| JP | 07-078097 | 3/1995 |
| JP | 2007-172082 | 7/2007 |
| JP | 2007-334709 | 12/2007 |

* cited by examiner

*Primary Examiner* — Yong Choe
(74) *Attorney, Agent, or Firm* — Staas & Halsey LLP

(57) ABSTRACT

A system and method of controlling copying including a management table for managing an update target data in a first storage volume and stored locations of before-update data of the update target data in a second storage volume, and relocating data in the second storage volume upon confirming a predetermined range of the first storage volume has been copied into the second storage volume using the management table.

15 Claims, 12 Drawing Sheets

FIG. 2B

311 SDV MANAGEMENT TABLE

| CURRENTRY USED OFFSET |
|---|
| 4 |

FIG. 2A

13b COPY DESTINATION VOLUME (SDV)

OFFSET 0 (PHYSICAL ADDRESS 0-15)
OFFSET 1 (PHYSICAL ADDRESS 16-31)
OFFSET 2 (PHYSICAL ADDRESS 32-47)
OFFSET 3 (PHYSICAL ADDRESS 48-63)
OFFSET 4 (PHYSICAL ADDRESS 64-79)

- USED
- USED
- USED
- USED
- USED

FIG. 8
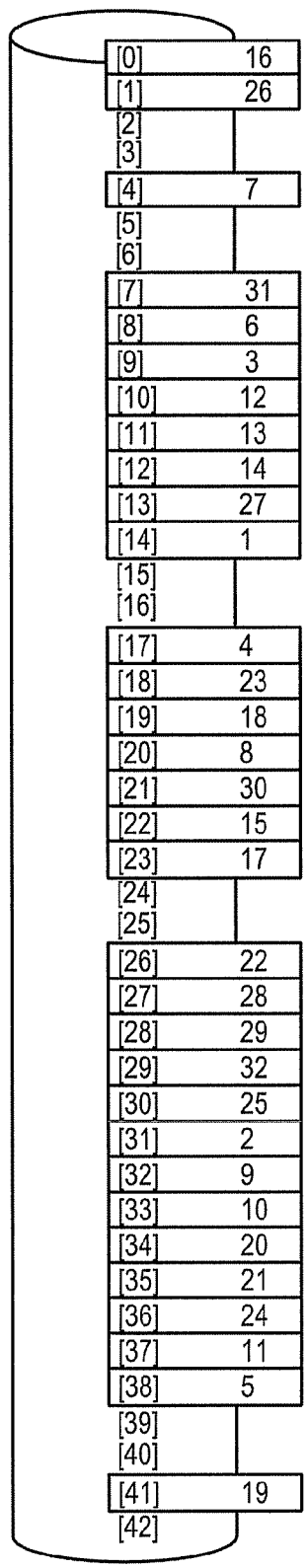
13a COPY SOURCE VOLUME
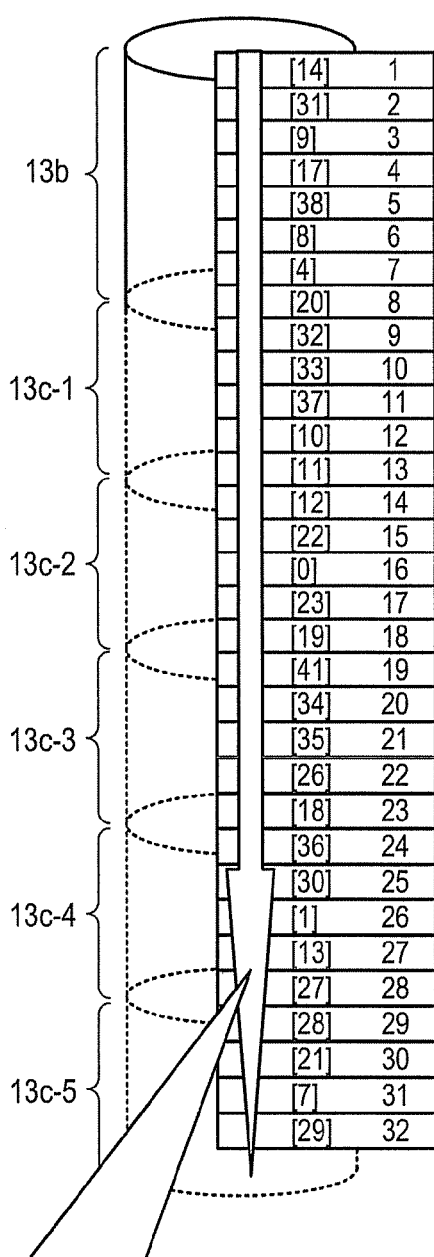
SDV (BEFORE RELOCATION)
THE PHYSICAL AREA SCATTERS BECAUSE IT IS ALLOCATED IN THE ORDER OF WRITE I/O, AND SEQUENTIAL ACCESS PERFORMANCE DECREASE
PARENTHESIZED NUMERALS REPRESENTS LOGICAL ADDRESS
NOT PARENTHESIZED NUMERALS REPRESENTS DATA UPDATE SEQUENSE

US 8,370,598 B2

STORAGE SYSTEM, COPY CONTROL METHOD, AND COPY CONTROL UNIT

CROSS-REFERENCE TO RELATED APPLICATIONS

This application is related to and claims the benefit of Application No. 2008-167399, filed on Jun. 26, 2008, in the Japan Patent Office, the disclosure of which is incorporated herein by reference.

BACKGROUND

The present invention relates to a technique for controlling data backup in a storage, and more particularly to a backup technique for copying data before an update in a data area (i.e., at updated locations) of a copy source volume, which has become an update target, to a copy destination volume.

FIELD

Generally, in a storage system for storing data, a disk array system is constituted by interconnecting a plurality of hard disks (hereinafter expressed by "HDDs") for data management in order to improve reliability in recording and reproducing the data. Also, in such a storage system, to protect data recorded in each HDD, the data recorded in the HDD is further recorded in another storage device (e.g., a magnetic tape or another HDD) for data backup.

The data backup is performed, for example, with the advanced copy function called OPC (One Point Copy). In the advanced copy, usually, a copy destination HDD having the same storage capacity as the data capacity of a copy source HDD is prepared. Then, all data in the copy source HDD is transferred to the copy destination HDD such that backup is established with the data recorded in the copy destination HDD. To support the above-mentioned advanced copy function, however, a large cost is required because a copy destination HDD having the same storage capacity as the data capacity of the copy source HDD is required.

In view of the above-described situation, the copy function (snapshot forming function) is also proposed which employs a copy destination HDD having a smaller data capacity than the copy source HDD and which backs up data in the copy source HDD at a predetermined time (see, e.g., Japanese Laid-open Patent Publication No. 2007-172082 and Japanese Laid-open Patent Publication No. 2007-334709). With the snapshot forming function, instead of copying all the data in the copy source HDD to the copy destination HDD, data before an update in a data area (in units of, e.g., 8 kbyte), which has become a target of an update request after the predetermined time, is copied to the copy destination HDD. Thus, a snapshot at the predetermined time is formed and backup of data at the predetermined time is realized. In other words, backup of the data in the copy source HDD is not always all updated, and the data becoming the update target is limited. Accordingly, data backup using the copy destination HDD having a smaller data capacity than the copy source HDD can be performed by copying, as described above, the before-update data just in the data area, which has become the update target, to the copy destination HDD.

As shown, by way of example, in FIGS. 11 and 12, respective data before an update in data areas, each of which has become an update target in a copy source volume (HDD), are transferred to a copy destination volume (HDD) in the sequence of update requests and are stored therein sequentially from the top, i.e., from an area of physical address 0.

When write requests are issued as update requests in sequence of Write I/O's (1) to (4), data (Old Data) at a logical address A2 of the copy source volume before update by the Write I/O (1) is first stored at a physical address 0 of the copy destination volume. Then, data at a logical address A4 before update by the Write I/O (2) is stored next to the "Old Data of A2". Similarly, data at a logical address A3 before update by the Write I/O (3) is stored next to the "Old Data of A4". Further, data at a logical address A1 before update by the Write I/O (4) is stored next to the "Old Data of A3".

The data copied into the copy destination volume in such a manner is recorded on an external storage device, e.g., a magnetic tape, from the copy destination volume for backup. When a host computer, for example, issues a read request for the copy destination volume and data as a target of the read request is not present in the copy destination volume at that time, this means that the relevant data is not yet updated and is present in the copy source volume. Therefore, the relevant data is read from the copy source volume.

Japanese Laid-open Patent Publication No. 7-78097 and Japanese Laid-open Patent Publication No. 63-4475 discuss techniques regarding the function of relocating file data on a disk drive, i.e., the deflag function of relocating fragmented file data to a continuous area.

By allocating data from the copy source volume to the copy destination volume as shown in FIGS. 11 and 12, even when the write requests (Write I/O's) for the copy source volume are issued at random access, the physical capacity of the copy destination volume can be used without waste. However, sequential access performance with respect to read requests (I/O's) is greatly reduced, for example, when the backup data in the copy destination volume is restored in a working volume, or when it is stored in a magnetic tape, etc.

For example, as shown in FIG. 12, four data areas continued in the copy source volume as physical areas in sequence of the logical addresses A1, A2, A3 and A4 are stored in sequence of A2, A4, A3 and A1 in the copy destination volume with the Write I/O's (1) to (4). Stated another way, the four data areas continuous in the copy source volume as physical areas are stored in the copy destination volume in a scattered state as physical areas. Accordingly, when the data areas of the logical addresses A1 to A4 are read from the copy source volume in sequence, higher sequential access performance is obtained because it is just required to read those data areas in sequence from the head. In contrast, when the data areas of the logical addresses A1 to A4 are read from the copy destination volume in sequence, the Old Data of A1 at the fourth physical address is first read. Then, the Old Data of A2 at the first physical address is read. Next, the Old Data of A3 at the third physical address is read. Finally, the Old Data of A4 at the second physical address is read. Therefore, the sequential access performance is greatly reduced and a great deal of time is required to read the target data.

SUMMARY

One object of the present invention is to maintain continuity of data by dynamically relocating data in a copy destination volume, and to realize a great improvement of the sequential access performance.

The present invention is not limited to the above-described, and another object of the present invention is to provide operating advantages obtained with various configurations described in the best mode for carrying out the present invention, which cannot be obtained with the related art.

A system and method of controlling copying including a management table for managing an update target data in a first storage volume and stored locations of before-update data of the update target data in a second storage volume, and relocating data in the second storage volume upon confirming a predetermined range of the first storage volume has been copied into the second storage volume using the management table.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 2A illustrates an example of a data-stored state of a Snap Data Volume (SDV).

FIG. 2B illustrates content(s) of the SDV management table corresponding to a stored state, shown in FIG. 1A, of the SDV.

FIG. 8 is an explanatory view for explaining a concrete example of a relocation operation executed by a storage system (a copy control unit) according to an embodiment.

DETAILED DESCRIPTION OF EMBODIMENTS

Figure 1A:
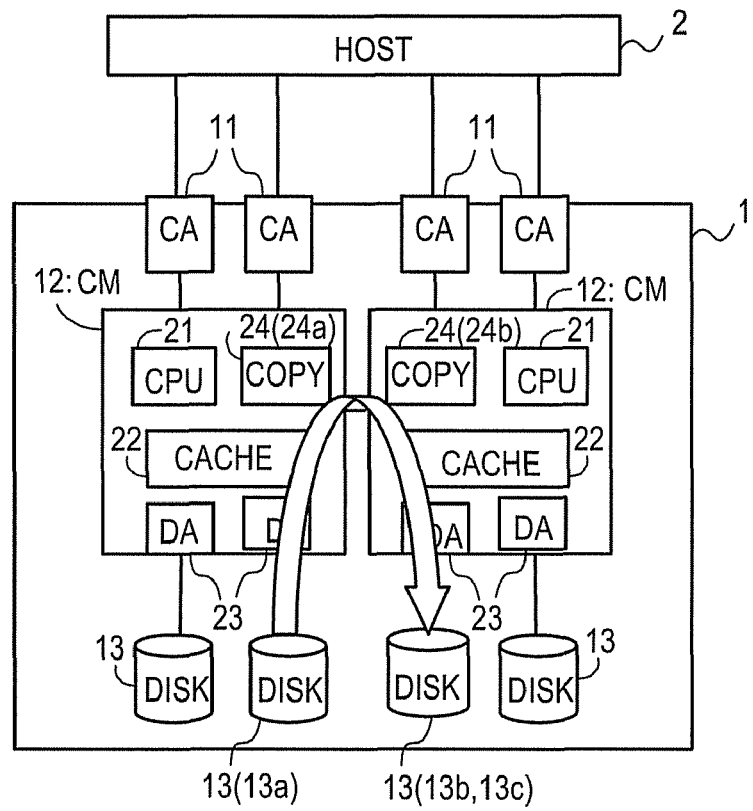
FIG. 1A is a block diagram showing a configuration of a storage system according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

The disclosed storage system includes a first storage volume in which data transmitted from a higher-level device is stored, a second storage volume into which before-update data (data before an update) at updated locations in the first storage volume is copied, and a control unit for controlling a process of the copying. The control unit may include a management table, a confirming section, and a relocation processing section. The management table manages the updated locations in the first storage volume and stored locations of the before-update data in the second storage volume. The confirming section confirms, on the basis of the management table, that data in a predetermined range of the first storage volume has been copied into the second storage volume. The relocation processing section executes, on the basis of a confirmation result, a relocation process of data in the second storage volume.

Further, according to an aspect a copy control method is implemented for use in copying before-update data of update target data in a first storage volume, in which data transmitted from a higher-level device is stored, to a second storage volume. The copy control method includes a confirmation operation, and a relocation processing operation. The management operation manages the update target data in the first storage volume and stored locations of the before-update data of the update target data in the second storage volume by using a management table. The confirmation operation confirms, on the basis of the management table, that data in a predetermined range of the first storage volume has been copied into the second storage volume. The relocate processing operation executes, on the basis of a confirmation result, relocation of data in the second storage volume.

In addition, this copy control unit is useable in copying before-update data of update target data in a first storage volume, in which data transmitted from a higher-level device is stored, to a second storage volume, and it comprises the above-mentioned management table, confirming section, and relocation processing section.

With the storage system, the copy control method, and the copy control unit disclosed herein, the update target data (updated locations) having been copied from the first storage volume (copy source volume) to the second storage volume (copy destination volume) is dynamically relocated by using the management table. Therefore, continuity of data is maintained and the sequential access performance is greatly improved.

An embodiment of the present invention will be described below with reference to the drawings.

FIG. 1(A) is a block diagram showing a configuration of a storage system according to an embodiment of the present invention. As shown in FIG. 1(A), a storage system 1 according to an embodiment is connected to a host computer (higher-level device; Host) 2 and receives various requests (such as a data write request, a data update request, and a data read request) from the host computer 2 to execute processes corresponding to the received requests. Further, the storage system 1 has the above-described snapshot forming function and is constituted by incorporating four CAs 11, two sets of CMs 12, and four disks (HDDs, Disks) 13 in one housing.

Each CA (Channel Adapter) 11 executes interface control with respect to the host computer 2 for data communication with respect to the host computer 2.

Each CM (Centralized Module) 12 is connected to two CAs 11 and 11 and two disks 13 to execute resource management in the present storage system 1. Further, each CM 12 executes various processes (such as a data write process, a data update process, a data read process, and a data copy process) for the two disks 13 corresponding to the requests from the host computer 2 and the other CM 12. The two sets of CMs 12 are connected to each other via a bus, for example, thus allowing access to the disk 13 contained in the other CM 12.

Each disk 13 loads and stores user data, control information, other information, etc. In the storage system 1 of an embodiment, it is assumed that one disk 13 contained in one CM 12 is a copy source volume (a first storage volume) 13a for storing data transmitted from the host computer 2. Also, it is assumed that one disk 13 contained in the other CM 12 is a copy destination volume (a second storage volume; SDV (Snap Data Volume)) 13b into which before-update data at updated locations in the copy source volume 13a is copied.

Herein, the data volume of the copy destination volume 13b is smaller than that of the copy source volume 13a. For example, if the data volume of the copy source volume 13a is 100 Gb, the data volume of the copy destination volume 13b is 10 Gb. In the storage system 1 of an embodiment, by using the above-described snapshot forming function, respective before-update data in data area (updated locations/update target data), each of which has become a target of an update request in the copy source volume 13a after a predetermined time, are copied into the copy destination volume 13b to be sequentially arranged from the top. The data area of the update target is set in units of, e.g., 8 kbyte. The snapshot forming function is realized with a copy control unit 24 (described in detail below) in the CM 12.

Further, the storage system 1 of an embodiment includes a pool area (reserve volume; virtual pool) 13c that is allocated to the copy destination volume 13b depending on a state of use of the copy destination volume (SDV) 13b. As described in detail below, the pool area 13c is allocated by the copy control unit 24 (also described in detail below) in the CM 12 to the copy destination volume 13b in predetermined allocation units (SDV units) depending on a state of use of the copy destination volume (SDV) 13b. For example, when the capacity of the copy destination volume 13b becomes deficient during a process of forming snapshots, the pool area 13c is added in the predetermined allocation unit and the added pool area 13c is used as the copy destination volume 13b (see, e.g., FIGS. 8 to 10).

Herein, an allocation amount (size) of the pool area 13c which is allocated by the copy control unit 24 (described in detail below) may be maintained constant (a predetermined unit) as described above, or may be variable depending on, e.g., the state of use of the copy destination volume 13b. Further, the pool area 13c may be prepared in the disk 13 including the copy destination volume 13b or in another disk 13 that is contained in the CM 12 managing the copy destination volume 13b.

The copy source volume 13a may be an entire data area of one disk 13 or a partial data area of one disk 13. Similarly, the copy destination volume 13b may be an entire data area of one disk 13 or a partial data area of one disk 13. While the copy source volume 13a serving as a first storage volume and the copy destination volume 13b serving as a second storage volume are disposed within the same housing in an embodiment, they may be disposed in different housings.

Each CM 12 includes a CPU 21, a cache memory 22, a DA 23, and the copy control unit 24. Two DAs (Disk Adapters) 23 and 23 execute interface control between two disks 13 and 13, which are contained in the relevant CM 12, for data communication between the disks 13. The cache memory (Cache) 22 stores user data, control data, etc., and it also temporarily stores data written to each disk 13 from the host computer 2 and data read from each disk 13 to the host computer 2 or the other CM 12. The CPU (Central Processing Unit) 21 manages the cache memory 22, the DA 23, and the later-described copy control unit 24. Further, the present invention is not limited to any particular number of components that form the system described herein.

Figure 1B:
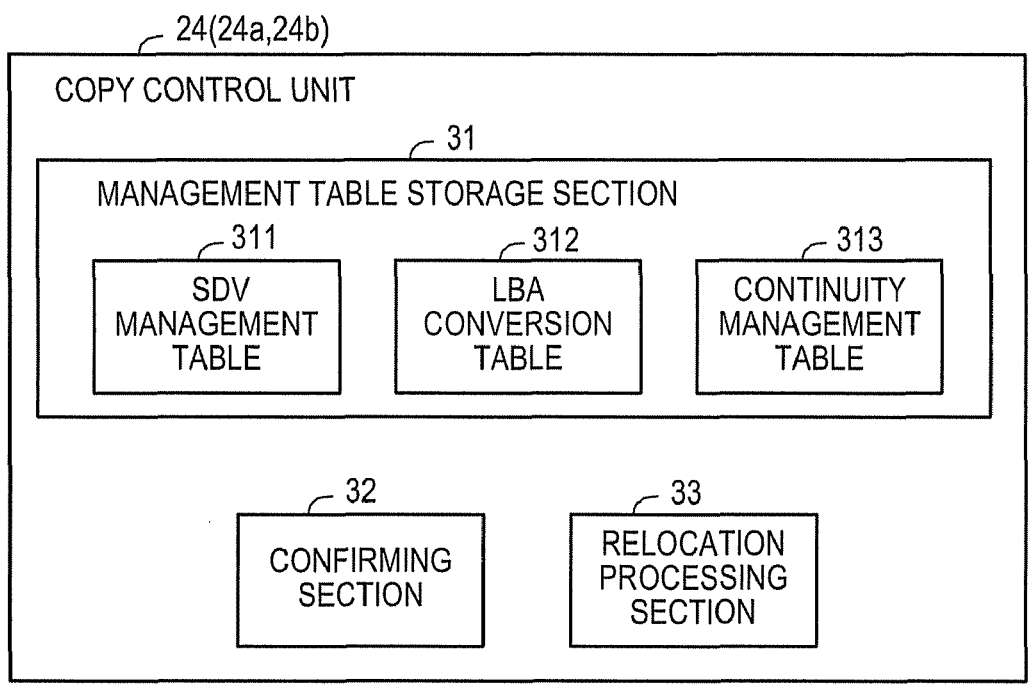
FIG. 1B is a block diagram showing a functional configuration of a copy control unit in a storage system.

The copy control unit (Copy) 24 controls a copy process of copying before-update data of update target data (at updated locations) in the copy source volume 13a into the copy destination volume 13b. The copy control unit 24 executes the above-described snapshot forming function and includes, as shown in FIG. 1B, a management table storage section 31, a confirming section 32, and a relocation processing section 33. FIG. 1B is a block diagram showing a functional configuration of the copy control unit 24 in the storage system 1.

The management table storage section 31 stores management tables for, by way of example, managing the update target data (updated locations) in the copy source volume 13a and stored locations of the before-update data of the update target data in the copy destination volume 13b. In an embodiment, an SDV management table 311, an LBA (Logical Block Address) conversion table 312, and a continuity management table 313 are stored as the management tables.

As described in detail below with reference to FIGS. 2A and 2B, the SDV management table 311 manages a data-stored state (used area) of the copy destination volume 13b to realize a snapshot forming function.

As described in detail below with reference to FIG. 3, the LBA conversion table 312 manages the logical address of update target data in the copy source volume 13a and the physical address of the before-update data of the update target data in the copy destination volume 13b.

As described in detail below with reference to FIG. 4, the continuity management table 313 determines whether continuous data in a predetermined range of the copy source volume 13a has become the update target and whether the continuous data in the predetermined range has been relocated, and it manages a relocation destination address when the continuous data is relocated.

The confirming section 32 confirms, on the basis of the continuity management table 313 contained in the management tables, that the continuous data in the predetermined range of the copy source volume 13a has been copied into the copy destination volume 13b.

The relocation processing section 33 executes a relocation process of data within the copy destination volume 13b on the basis of the confirmation result of the confirming section 32. In practice, the relocation process is executed in a manner described in detail below with reference to FIGS. 5 to 10. To briefly describe the relocation process here, when the continuous data in the predetermined range of the copy source volume 13a is copied into the copy destination volume 13b, the relocation processing section 33 first decides the destination of the relocation. Then, the relocation processing section 33 searches, on the basis of the LBA conversion table 312, at which position in the copy destination volume 13b the continuous data in the predetermined range of the copy source volume 13a is stored. Then, the relocation processing section 33 relocates the relevant data in the copy destination volume 13b such that individual data are rearranged at the relocation destination in the same sequence (for example, in an ascending order of logical addresses) as the data sequence in the copy source volume 13a.

At that time, when there is a not-used area in the copy destination volume 13b, the relocation processing section 33 can execute the data relocation process by using the not-used area as the relocation destination. Also, when the not-used area in the copy destination volume 13b is not small or not present, the data relocation processing section 33 can execute the relocation process by using, as the relocation destination, the pool area 13c allocated to the copy destination volume 13b. In the following description, it is assumed that the pool area 13c is used as the relocation destination.

Further, the relocation processing section 33 allocates the data, which has been relocated in the allocated pool area 13c (i.e., the data rearranged in the sequence of logical addresses as described in detail below), to the copy destination volume 13b. In other words, the relocation processing section 33 uses the pool area 13c having been used in the relocation process, as it is, as the copy destination volume 13b. On that occasion, the relocation processing section 33 may allocate the pool area 13c of the predetermined unit after the relocation instead of an area (in the copy destination volume 13b or the pool area 13c) which has become empty with the relocation process, or may simply add the pool area 13c to the copy destination volume 13b.

Still further, the relocation processing section 33 executes a relocation process on respective data in the copy destination volume 13b, which correspond to areas where the copying of the data in the predetermined range of the copy source volume 13a is not yet completed, such that the respective data are arranged in a predetermined sequence. Stated another way, as described in detail below with reference to FIGS. 7, 9 and 10, the relocation processing section 33 relocates data units in a discrete (without disruption) state in the copy destination volume 13b such that they are rearranged at the relocation destination in the same sequence (ascending order of logical addresses) as the data sequence in the copy source volume 13a.

In an embodiment, the above-mentioned predetermined range refers to a range of data area that is partitioned in the same units as the allocation unit (certain value) of the pool area 13c. The predetermined range may be a result related to a system specification and/or based on a request.

The copy control unit 24 may be independent of the CPU 21 and the cache memory 22 as shown in the form of a block separate from the CPU 21 and the cache memory 22 in FIG. 1A, or it may be part of the CPU 21 and the cache memory 22. In the latter case, the CPU 21 executes the snapshot forming function and the functions of both the confirming section 32 and the relocation processing section 33, whereas the cache memory 22 functions as the management table storage section 31.

In FIGS. 1A and 1B, one of the two copy control units 24, which is disposed in the copy source side, is denoted by a character 24a, and the other one disposed in the copy destination side is denoted by a character 24b. Each of the copy-source copy control unit 24a and the copy-destination copy control unit 24b may have the same configuration as that of the copy control unit 24 shown in FIG. 1B. Alternatively, either the copy-source copy control unit 24a or the copy-destination copy control unit 24b may have the same configuration as that of the copy control unit 24 shown in FIG. 1B. Further, the same configuration as that of the copy control unit 24 shown in FIG. 1B may be provided by cooperation of both the copy-source copy control unit 24a and the copy-destination copy control unit 24b.

The SDV management table 311, the LBA (Logical Block Address) conversion table 312, and the continuity management table 313 used in an embodiment will be described in more detail below with reference to FIGS. 2 to 4.

The SDV management table 311 is first described with reference to FIGS. 2A and 2B. Herein, FIG. 2A illustrates one example of the data-stored state of the SDV 13b, and FIG. 2B illustrates the contents of the SDV management table 311 corresponding to the data-stored state of the SDV 13b shown in FIG. 2A.

In the copy destination volume (SDV) 13b, as described above, the data areas each having a size of the predetermined unit are stored to be sequentially arranged from the top, i.e., from an area of the physical address 0. Therefore, the copy control unit 24 is required to manage a used area by continuing to check until which location the copy destination volume 13b is used at present. The SDV management table 311 is employed for the management of the used area. In an embodiment, each data area of the predetermined unit is managed as a data area corresponding to, e.g., 16 LBA (Logical Block Address), which is called an "offset". In this case, because of 1 LBA=512 byte, 16 LBA=512*16=8 kbyte is resulted. Thus, the physical capacity is managed in units of 8 kbyte inside the storage system 1. It is to be, however, noted that 8 kbyte is merely one example and the unit for the management is not limited to 8 kbyte.

As shown in FIG. 2B, information indicating until which location the copy destination volume 13b is used at present is stored in the SDV management table 311. In more detail, when data is written in the copy destination volume 13b from an offset 0 (physical addresses 0-15) to an offset 4 (physical addresses 64-79) thereof and the offsets 0 to 4 are in the used state as shown in FIG. 2A, the SDV management table 311 holds "4" therein as a "Currently Used Offset" as shown in FIG. 2B. In such a state, when an update request for a not-yet-copied data area of the copy source volume 13a is generated and the not-yet-copied data area (Old Data) needs to be stored in the copy destination volume 13b, the copy control unit 24 refers to the SDV management table 311 and stores the relevant not-yet-copied data area (Old Data) in a next offset 5 of the copy destination volume 13b.

Next, the LBA conversion table 312 is described with reference to FIG. 3.

The copy destination volume (SDV) 13b is a volume that is made to appear to be able to store a larger amount of data than the actual physical capacity. Because the data areas having a size of the predetermined unit per area, each of which has become the update target, are stored in the copy destination volume 13b to be sequentially arranged from the top in the update sequence, those data areas are stored in the sequence (random state) different from the data sequence in the copy source volume 13a. Accordingly, the copy control unit 24 is required to, for the data relocation, manage the correspondence between a logical volume image (logical address) and a position (physical address) at which actual data stored. The LBA conversion table 312 is used to execute the management of the correspondence.

Figure 3:
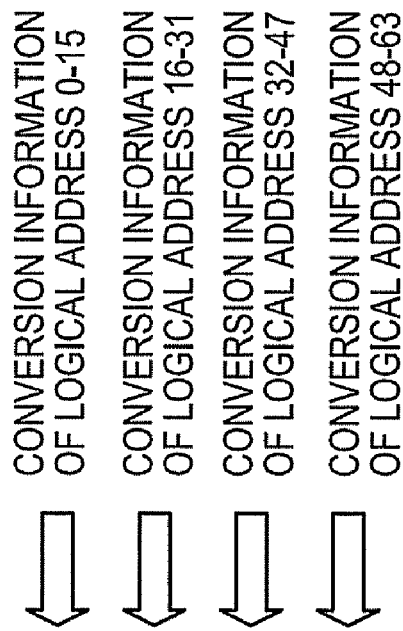
FIG. 3 is an explanatory view for explaining a Logical Block Address (LBA) conversion table in an embodiment.

In the LBA conversion table 312, as shown in FIG. 3, "Control Information", "LU (Logical Unit) Number", and "Physical Addresses" are stored, as conversion information, for each of logical addresses of the copy source volume 13a in predetermined units (here in units of 8 kbyte). In an embodiment, there is a possibility that actual data is stored in a separate volume (reserve volume (pool area) 13c) in a disk separate from the disk 13 to which the copy destination volume 13b belongs. For that reason, the "LU Number" for specifying the volume (disk) is also stored in addition to the "Physical Addresses" in the volume. The "Control Information" is auxiliary additional information for control. Information (flag) indicating, per data area of the predetermined unit, whether the relocation is already executed or not yet executed may also be stored and managed as the "Control Information" in the LBA conversion table 312.

In the LBA conversion table 312 shown in FIG. 3, the "Control Information", the "LU Number", and the "Physical Addresses" corresponding to each data area of the predetermined unit (here in the unit of 8 kbyte) are stored, as the conversion information, in the sequence (ascending order) of logical addresses of the copy source volume 13a. More specifically, a first entry of the LBA conversion table 312 stores the copy destination information (i.e., the LU number and the physical addresses) and the control information for the data area of the logical addresses 0-15. Also, a second entry thereof stores the copy destination information (i.e., the LU number and the physical addresses) and the control information for the data area of the logical addresses 16-31. Subsequently, the conversion information is likewise stored in each corresponding entry per data area in the unit of 8 kbyte in order of logical addresses.

Next, the continuity management table 313 will be described with reference to FIG. 4. FIG. 4 illustrates a concrete example of the content(s) of the continuity management table 313 in an embodiment.

Figure 4:
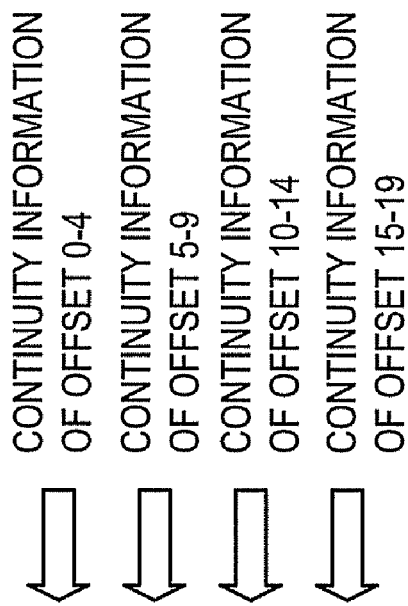
FIG. 4 illustrates a concrete example of content(s) of a continuity management table in an embodiment.

The continuity management table 313 shown in FIG. 4 has an entry for each threshold unit (above-described predetermined range) based on which a start of a relocation is decided. Herein, for example, the continuous data in the above-described predetermined range is assumed to be continuous data corresponding to 5 offsets. It is also assumed that, when the continuous data corresponding to 5 offsets in the copy source volume 13$a$ is all updated upon receiving an update request and respective before-update data (Old Data) are all transferred to and copied in the copy destination volume 13$b$ (or the pool area 13$c$), the relocation processing section 33 starts the relocation of the relevant continuous data. In other words, one entry on the continuity management table 313 stores and manages continuity information corresponding to 5 offsets. In the example shown in FIG. 4, the first entry stores the continuity information regarding the offsets 0-4 of the copy source volume 13$a$, and the second entry stores the continuity information regarding the offsets 5-9 of the copy source volume 13$a$. Subsequently, the continuity information of continuous data corresponding to 5 offsets is stored in each entry in the sequence of data.

For example, "Number of Offsets", "Number of Executed Updates", "Address of Relocation Destination", and "Relocation Situation" are registered as the continuity information. Although specific examples of contents of the continuity management table are described herein, content(s) thereof are not limited to any particular information.

The "Number of Offsets" represents a size (range) of the data area managed in a relevant entry. Herein, the "Number of Offsets" is uniformly set to "5" as mentioned above. The "Number of Executed Updates" represents a number of updated one(s) among 5 offsets which are managed in a relevant entry, i.e., a number of respective before-update data (Old Data) that have been completely transferred to the copy destination volume 13$b$. The "Number of Executed Updates" is updated whenever the copy control unit 24 transfers the before-update data (Old Data) to the copy destination volume 13$b$.

If the "Number of Executed Updates" reaches the "Number of Offsets", i.e., "5", this indicates that the respective before-update data of the continuous data in the predetermined range have been all transferred to the copy destination volume 13$b$. When the completion of such data transfer is confirmed by the confirming section 32 which refers to the continuity management table 313, the relocation processing section 33 starts the relocation process using an empty area of the copy destination volume 13$b$ or using the pool area 13$c$. At that time, the relocation processing section 33 decides and acquires an area in the copy destination volume 13$b$ or a new pool area 13$c$ (pool area of the predetermined allocation unit; area corresponding to 5 offsets herein) for executing the relocation process, and registers the address (LU number and address (LBA)) of the acquired area as the "Address of Relocation Destination". Further, the relocation processing section 33 executes actual data transfer for the relocation process per offset (8 kbyte herein) by using the conversion information in the LBA conversion table 312 such that, at the relocation destination, the data areas (each data area corresponding to one offset) are relocated in the order of logical addresses. On that occasion, an influence upon the Host I/O is held at minimum by setting a data transfer area per once to be as possible as narrow. When the relocation of the data corresponding to 5 offsets in the relevant entry is completed, the relocation processing section 33 changes the "Relocation Situation" from "Not Yet Completed" to "Completed".

The number of offsets per allocation unit of the pool area 13$c$ is equal for all the pool areas. However, the number of offsets in the area of the copy destination volume (SDV) 13$b$ may differ from the number of offsets in the allocation unit of the pool area 13$c$. Therefore, the "Numbers of Offsets" differing in values in different entries may be registered in the continuity management table 313 in some cases. In an example shown in FIGS. 8 to 10, the number of offsets in the area of the copy destination volume (SDV) 13$b$ is 7 and the number of offsets in the allocation unit of the pool area 13$c$ is 5. Further, the size of the above-mentioned predetermined range set as the "Number of Offsets" for each entry of the continuity management table 313 can be variably set by a user. For the sake of simplicity, however, the size of the above-mentioned predetermined range is set, as described above, to be the same as the allocation unit of the pool area (corresponding to 5 offsets herein) in an embodiment.

Herein, the first entry of the continuity management table 313, shown in FIG. 4, registers therein the continuity information of the offsets 0-4, including "5" as the number of offsets, "5" as the number of executed updates, "LU 20 LBA 100" as the address of the relocation destination, and "Not Yet Completed" as the relocation situation. Thus, the continuous data of the offsets 0-4 is in the state where update transfer of all the data is completed and the relocation process to the address "LU 20 LBA 100" of the relocation destination is started, but the relocation process is not yet completed.

Also, the second entry of the continuity management table 313, shown in FIG. 4, registers therein the continuity information of the offsets 5-9, including "5" as the number of offsets, "0" as the number of executed updates, "--" (not yet registered) as the address of the relocation destination, and "Not Yet Completed" as the relocation situation. Thus, the continuous data of the offsets 5-9 is in the state where update transfer of the data is not completed (not started); hence the address of the relocation destination is not yet registered and the relocation process is not yet started.

Further, the third entry of the continuity management table 313, shown in FIG. 4, registers therein the continuity information of the offsets 10-14, including "5" as the number of offsets, "5" as the number of executed updates, "LU 10 LBA 500" as the address of the relocation destination, and "Completed" as the relocation situation. Thus, the continuous data of the offsets 10-14 is in the state where update transfer of all the data is completed and the relocation process to the address "LU 10 LBA 50" of the relocation destination is completed.

Still further, the fourth entry of the continuity management table 313, shown in FIG. 4, registers therein the continuity information of the offsets 15-19, including "5" as the number of offsets, "2" as the number of executed updates, "--" (not yet registered) as the address of the relocation destination, and "Not Yet Completed" as the relocation situation. Thus, the continuous data of the offsets 15-19 is in the state where update transfer of the data just corresponding to 2 offsets is completed, the address of the relocation destination is not yet registered, and the relocation process is not yet started.

Next, the operation of the storage system 1 of an embodiment is described with reference to FIGS. 5 to 10.

Figure 5:
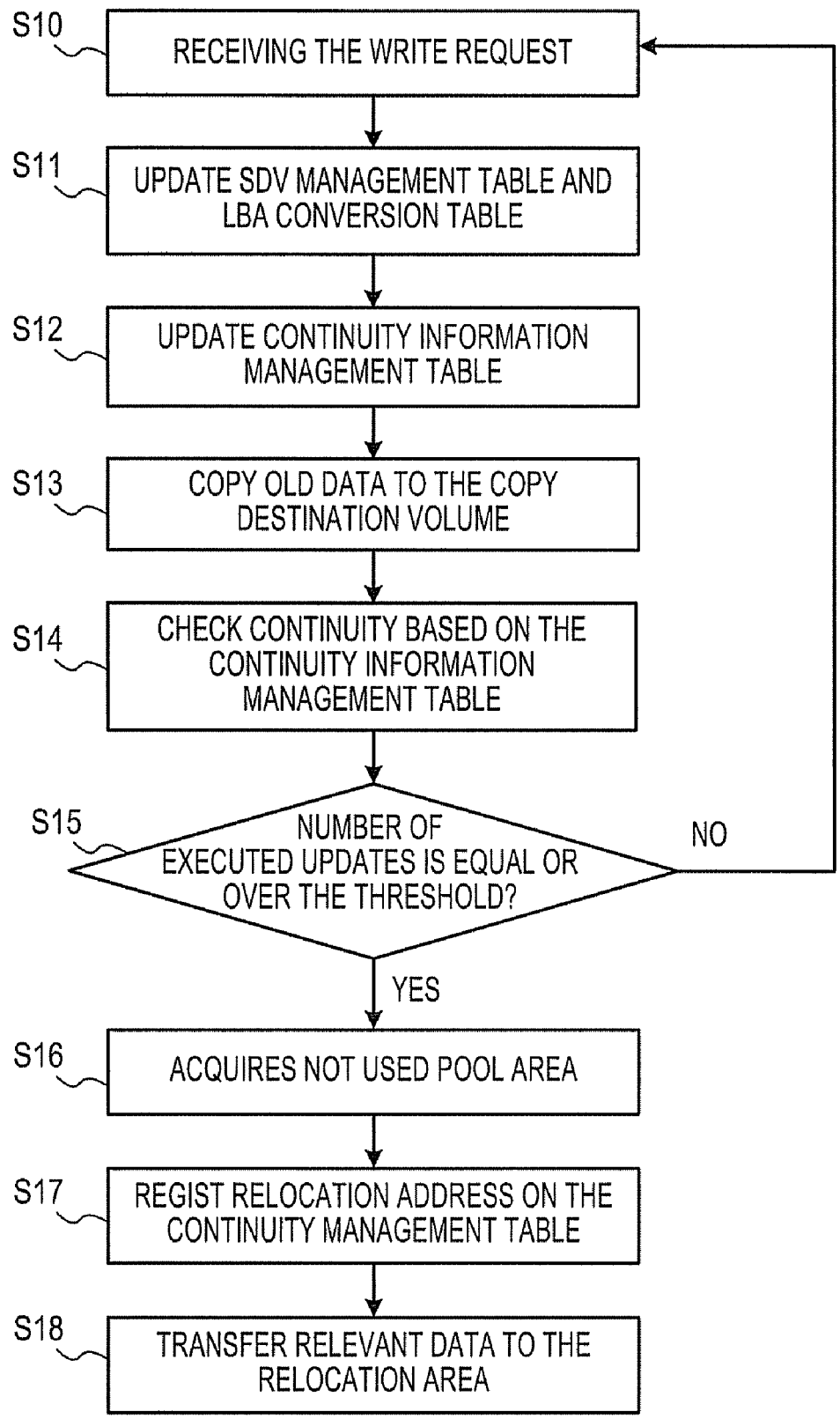
FIG. 5 is a flowchart for explaining a relocation destination decision procedure(s) executed by a storage system (a copy control unit) according to an embodiment.

With reference to a flowchart (operations S10 to S18) shown in FIG. 5, a description is first made of the relocation destination decision procedure(s) executed by the copy control unit 24, 24a or 24b (specifically, the relocation processing section 33) in the storage system 1 according to an embodiment.

After starting the process of forming snapshots, the copy control unit 24 comes into a state of waiting for receipt of a write request (Write I/O) for a not-yet-copied area (not-yet-updated area) of the copy source volume 13a from the host computer 2. Upon receiving the write request (operation S10), the copy control unit 24 increments a value of the "Currently Used Offset" in the SDV management table 311 by 1 for update. Also, the copy control unit 24 registers, in the LBA conversion table 312, a correspondence between the logical address of a current update target area and a physical address of the copy destination volume 13b, the latter corresponding to the updated value of the "Currently Used Offset" in the SDV management table 311, as the conversion information together with the control information (operation S1; management operation). Further, the copy control unit 24 increments a value of the "Number of Executed Updates" in the continuity information of the offset, which corresponds to the current update target area, by 1 for update (operation S12).

Then, the copy control unit 24 transfers respective before-update data (Old Data) in the current update target area to the copy destination volume 13b to be copied and sequentially arranged from the top (operation S13), and further checks the continuity of the data on the basis of the continuity management table 313 (operation S14). In other words, the copy control unit 24 refers to, in the continuity management table 313, the "Number of Executed Updates" in the entry corresponding to the predetermined range (covering 5 offsets), which includes the current update target area (operation S14). Further, the copy control unit 24 determines whether the "Number of Executed Updates" is equal to or larger than the "Number of Offsets" (threshold) in the same entry (operation S15).

If the "Number of Executed Updates" is smaller than the "Number of Offsets" (NO route of operation S15), the process returns to operation S10 where the copy control unit 24 comes into a state of waiting the next write request (Write I/O). On the other hand, if the "Number of Executed Updates" is equal to or larger than the "Number of Offsets" (YES route of operation S15; confirmation operation by the confirming section 32), this indicates that the continuous data in the predetermined range (corresponding to 5 offsets) including the current update target area has been all copied into the copy destination volume 13b. Therefore, the relocation processing section 33 of the copy control unit 24 acquires the not-yet-used pool area 13c of the predetermined allocation unit (corresponding to 5 offsets) (operation S16) and decides the acquired pool area 13c as the relocation destination as the relevant continuous data.

Then, the relocation processing section 33 registers the address of the relocation destination in the corresponding entry of the continuity management table 313 (operation S17). Further, the relocation processing section 33 transfers the relevant continuous data from the copy destination volume 13b to the relocation destination on the basis of the LBA conversion table 312 in an asynchronous relation to the write request (Write I/O) from the host computer 2 and executes the relocation process such that the relevant continuous data is arranged in order of logical addresses (operation S18; relocation process operation).

Figure 6:
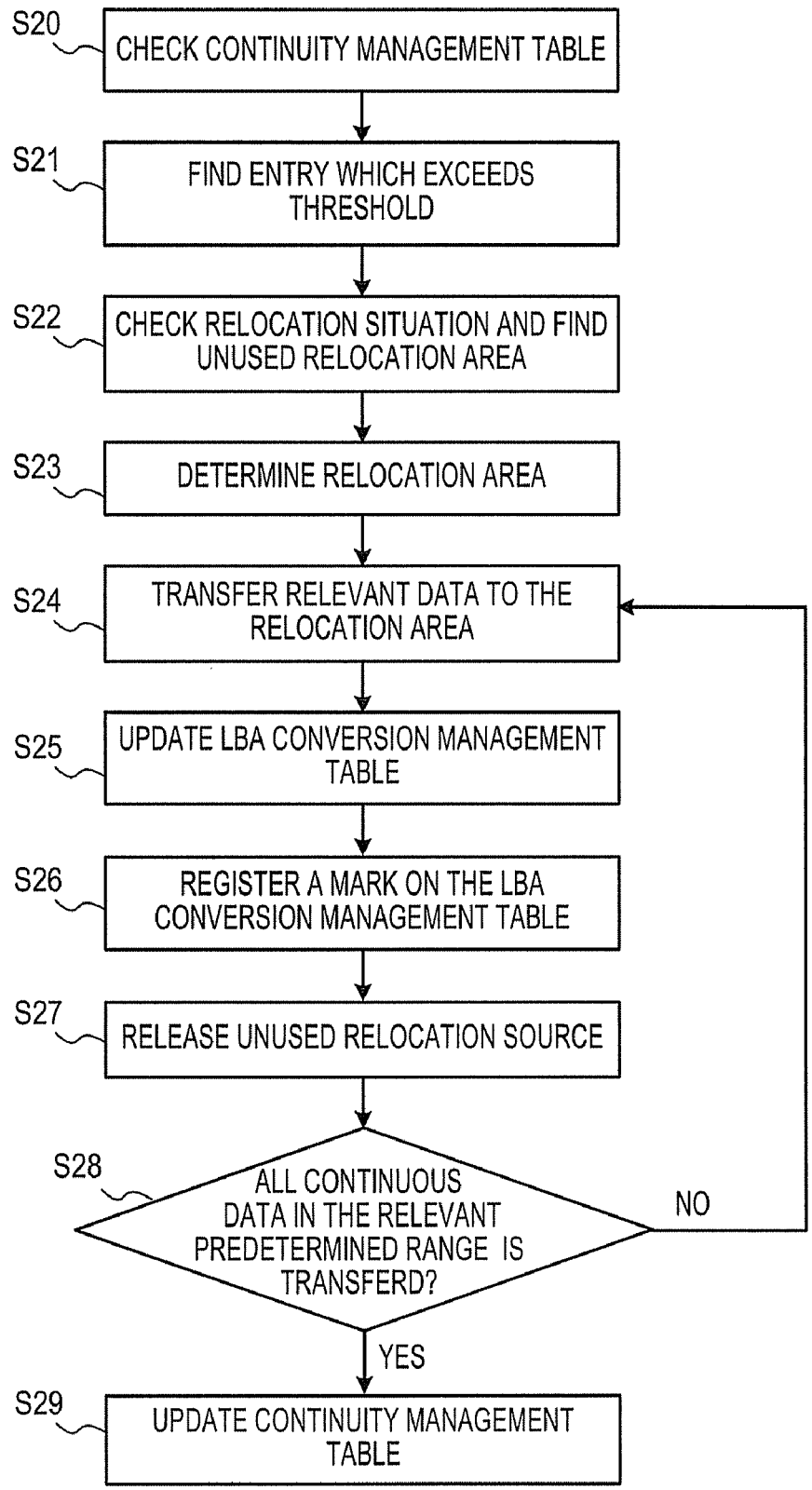
FIG. 6 is a flowchart for explaining a relocation procedure(s) executed by a storage system (a copy control unit) according to an embodiment.

Next, with reference to a flowchart (operations S20 to S29) shown in FIG. 6, a description is made of the relocation procedure(s) executed by the copy control unit 24, 24a or 24b (specifically, the relocation processing section 33) in the storage system 1 according to an embodiment.

The relocation processing section 33 executes relocation schedule management (such as confirmation as to whether the relocation is already completed or not yet completed) by using the continuity management table 313. More specifically, the relocation processing section 33 refers to and checks the continuity management table 313 in an asynchronous relation to the write request (Write I/O) from the host computer 2 (operation S20). Then, the relocation processing section 33 finds an entry in which the "Number of Executed Updates" is equal to or larger than the "Number of Offsets" (threshold) (operation S21), and further finds an entry in which the relocation is not yet completed, by referring to the "Relocation Situation" (operation S22).

If such an entry is found, the relocation processing section 33 confirms the address of the relocation destination address, which has been decided and registered in operations S16 and S17 of FIG. 5, thus finally determining the relocation destination (operation S23). Then, the relocation processing section 33 transfers, on the basis of the LBA conversion table 312, the continuous data in the predetermined range (covering 5 offsets), which corresponds to the relevant entry, to the relocation destination (i.e., the pool area 13c of the allocation unit) per offset and executes the relocation process such that the relevant continuous data is arranged in the sequence of logical addresses (operation S24; relocation operation). If the entry satisfying the requirements checked in operations S21 and S22 is not found, the relocation processing section 33 returns to operation S20 to repeat operations S20 to S22.

When the transfer (relocation) of the data corresponding to 1 offset in the relevant predetermined range is completed, the relocation processing section 33 rewrites the physical address of the relevant data in the LBA conversion table 312 to the physical address of the relocation destination (operation S25). Further, after the completion of the transfer, the relocation processing section 33 sets and registers a mark (flag) indicating the completion of the relocation in the "Control Information" in the corresponding entry on the LBA conversion table 312 (operation S26). If the pool area 13c of the allocation unit at the relocation source has come into a not-used state (empty state) with the data transfer executed at this time, the relocation processing section 33 releases the relevant pool area 13c (operation S27). If the pool area 13c of the allocation unit at the relocation source has not come into the not-used state (empty state), the processing of operation S27 is omitted.

Thereafter, the relocation processing section 33 determines whether the transfer (relocation) of all the continuous data in the relevant predetermined range (corresponding to 5 offsets) is completed (operation S28). If the transfer of all the continuous data is not yet completed (NO route of operation S28), the relocation processing section 33 returns to the processing of operation S24. On the other hand, If the transfer of all the continuous data is completed (YES route of operation S28), the relocation processing section 33 changes the "Relocation Situation" in the corresponding entry on the continuity management table 313 from "Not Yet Completed" to "Completed" and registers the latter (operation S29).

As described in detail below with reference to FIGS. 9 and 10, at the time when the relocation of all the data within the allocation unit of the pool area 13c is completed, the relocation processing section 33 discards the data before the relocation and releases the relevant pool area 13c. Further, when a write request (Write I/O) is issued from the host computer 2 for a portion of the data in the copy destination volume 13b (or the pool area 13c) which is not yet relocated, the relocation processing section 33 executes the relocation in continuation to the I/O. On the other hand, when a read request (Read I/O) is issued from the host computer 2 for the portion of the data which is not yet relocated, the CM 12 causes the host computer 2 to read the not-yet-relocated portion, as it is, for the purpose of cutting overhead. With such a process, the host computer 2 can cause the relocation processing section 33 to execute the data relocation without paying a particular consideration, i.e., without affecting the operation of the host computer 2.

Figure 7:
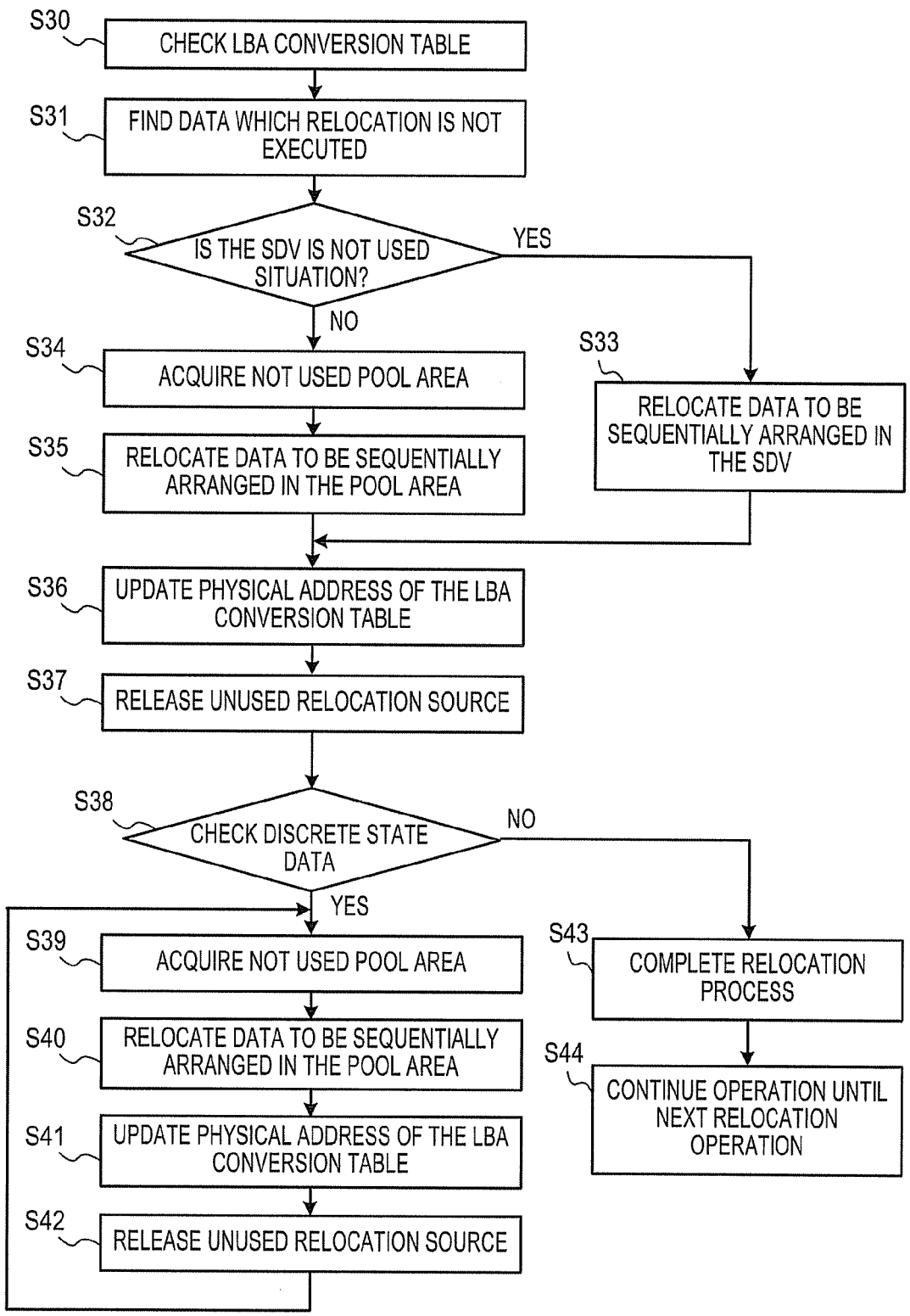
FIG. 7 is a flowchart for explaining a discrete part relocation procedure(s) executed by a storage system (a copy control unit) according to an embodiment.

Next, with reference to a flowchart (operations S30 to S44) shown in FIG. 7, a description is made of the discrete part relocation procedures executed by the copy control unit 24, 24a or 24b (specifically, the relocation processing section 33) in the storage system 1 according to an embodiment. The term "discrete parts" refers to a group of data which remain, as a result of the relocation process, in a discrete (without disruption) state on the copy destination volume 13b or the pool area 13c (see, areas denoted by characters 13c-2 to 13c-5 in FIG. 9) added to the copy destination volume 13b, as described in detail below with reference to, e.g., FIG. 9.

Here, the relocation processing section 33 searches all the currently used offsets during low usage or operation hour(s) where an operation load is small. Then, the relocation processing section 33 relocates data locations (discrete parts), for which the mark (flag) indicating the relocation is not set in the entry on the LBA conversion table 312, into a newly assigned pool area 13c to be sequentially arranged from the top (see, e.g., areas denoted by characters 13c-10 to 13c-12 in FIG. 10). The relocation process for the discrete parts can be executed similarly to the ordinary relocation process described above with reference to FIG. 6 while the relocation processing section 33 receives I/O requests from the host computer 2. Also, similarly to the ordinary relocation process described above with reference to FIG. 6, the not-used pool area is released in the relocation process for the discrete parts. When the copy destination volume (SDV) 13b has finally come into an empty state, the relocation processing section 33 sets again a schedule for the relocation from the pool area 13c to the copy destination volume (SDV) 13b so as to avoid wasteful use of the physical capacity.

To execute the relocation process for the discrete parts, as shown in FIG. 7, the relocation processing section 33 refers to and checks the mark (flag) indicating the completion of the relocation in the "Control Information" in the LBA conversion table 312 during low usage hours where the operation load is small (operation S30). Then, the relocation processing section 33 finds data locations for which the relocation is not yet executed (i.e., data areas for which the mark (flag) indicating the completion of the relocation is not set in the corresponding entry) in sequence (ascending order) from the least logical address (operation S31).

Then, the relocation processing section 33 determine whether the copy destination volume (SDV) 13b is in the not-used state (operation S32). If it is in the not-used state (YES route of operation S32), the relocation processing section 33 relocates respective data in the discrete parts into the copy destination volume (SDV) 13b to be sequentially arranged from the top in ascending order of logical addresses (operation S33), and then shifts to processing of operation S36 described in detail below.

On the other hand, if the copy destination volume (SDV) 13b is in the used state (NO route of operation S32), the relocation processing section 33 acquires the not-used pool area 13c of the predetermined allocation unit (corresponding to 5 offsets) (operation S34). Then, the relocation processing section 33 relocates respective data in the discrete parts into the acquired pool area 13c to be sequentially arranged from the top in ascending order of logical addresses (operation S35).

Thereafter, at the same time as relocating the data in the discrete parts, the relocation processing section 33 rewrites the physical address of the relevant data in the LBA conversion table 312 to the physical address of the relocation destination (operation S36). Further, if the pool area 13c of the allocation unit at the relocation source has come into the not-used state (empty state) with the data relocation executed at this time, the relocation processing section 33 releases the relevant pool area 13c (operation S37). If the pool area 13c of the allocation unit at the relocation source has not come into the not-used state (empty state), the processing of operation S37 is omitted.

Then, the relocation processing section 33 checks the above-described flag in the LAB conversion table 312 and determines whether there is data in the discrete state (operation S38). If the data in the discrete state is present ("YES" route of operation S38), the relocation processing section 33 executes operations S39 to S42, which are similar to the above-described operations S34 to S37, and then returns to the processing of operation S38. On the other hand, if the data in the discrete state is not present ("NO" route of operation S38), the relocation processing section 33 completes the relocation process of the discrete parts (operation S43) and then continues the operation until the relocation process for the discrete parts is next generated (operation S44).

Figure 9:
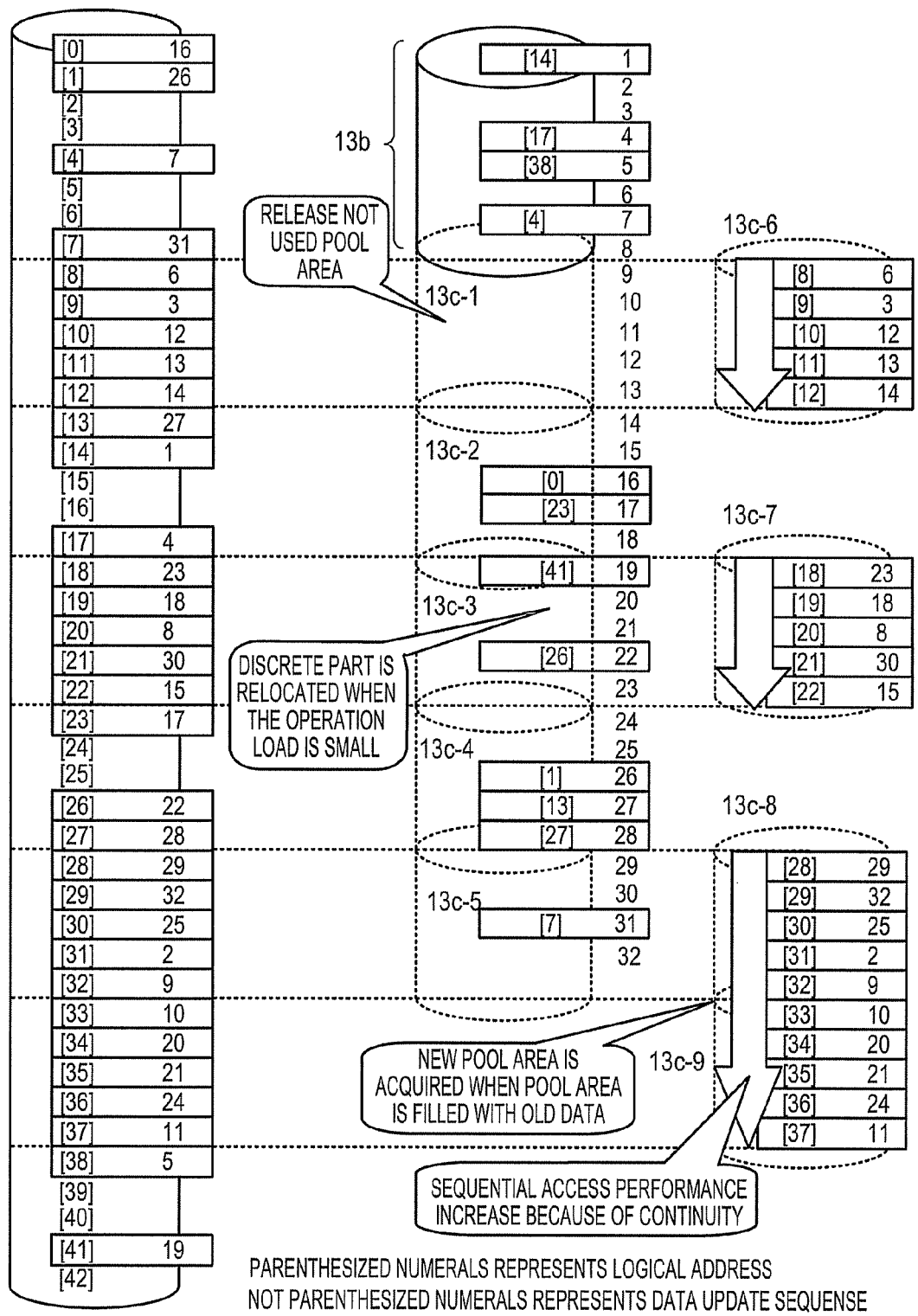
FIG. 9 is an explanatory view for explaining a concrete example of a relocation operation executed by a storage system (a copy control unit) according to an embodiment.
Figure 10:
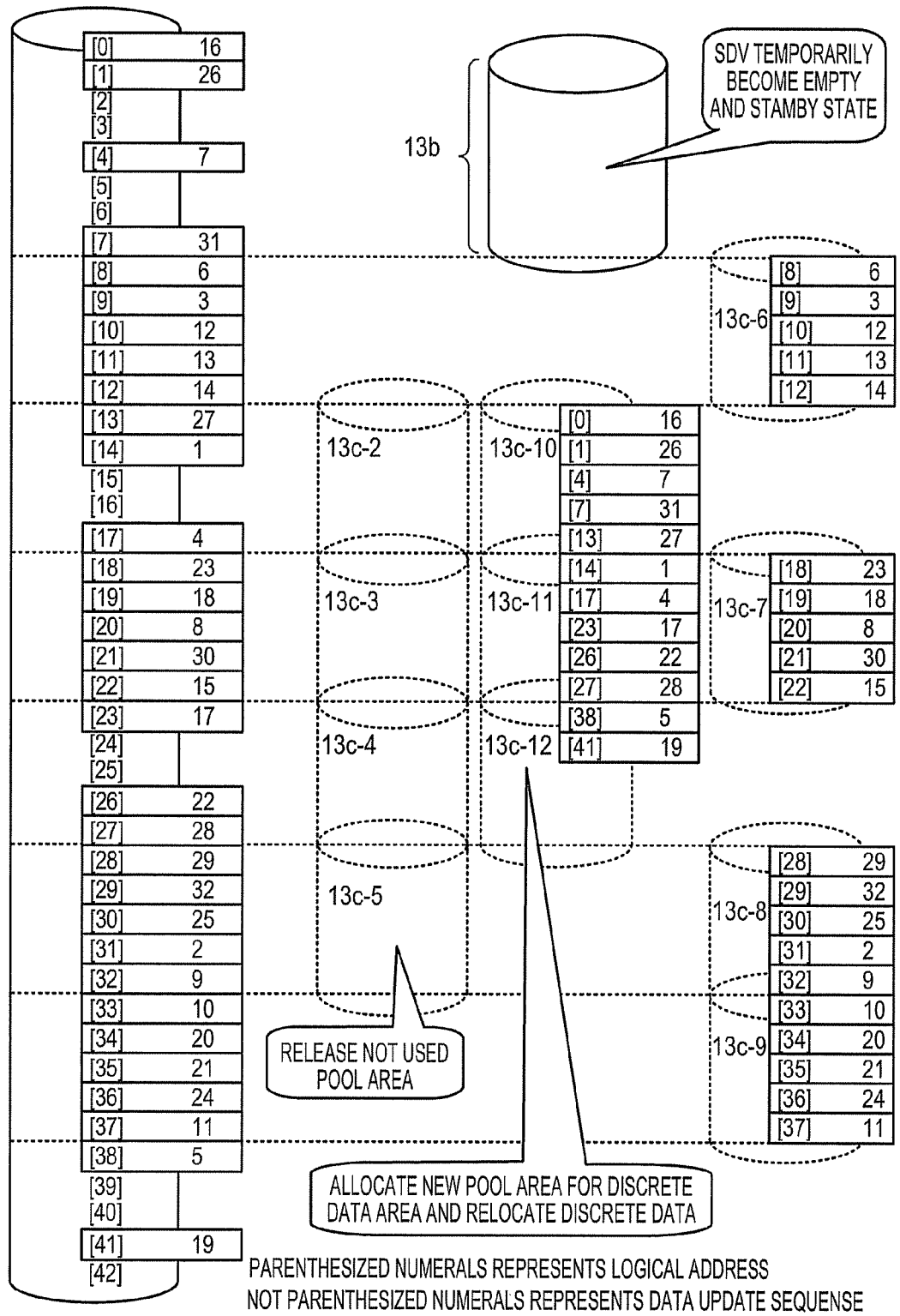
FIG. 10 is an explanatory view for explaining a concrete example of a relocation operation executed by a storage system (a copy control unit) according to an embodiment.
Figure 11:
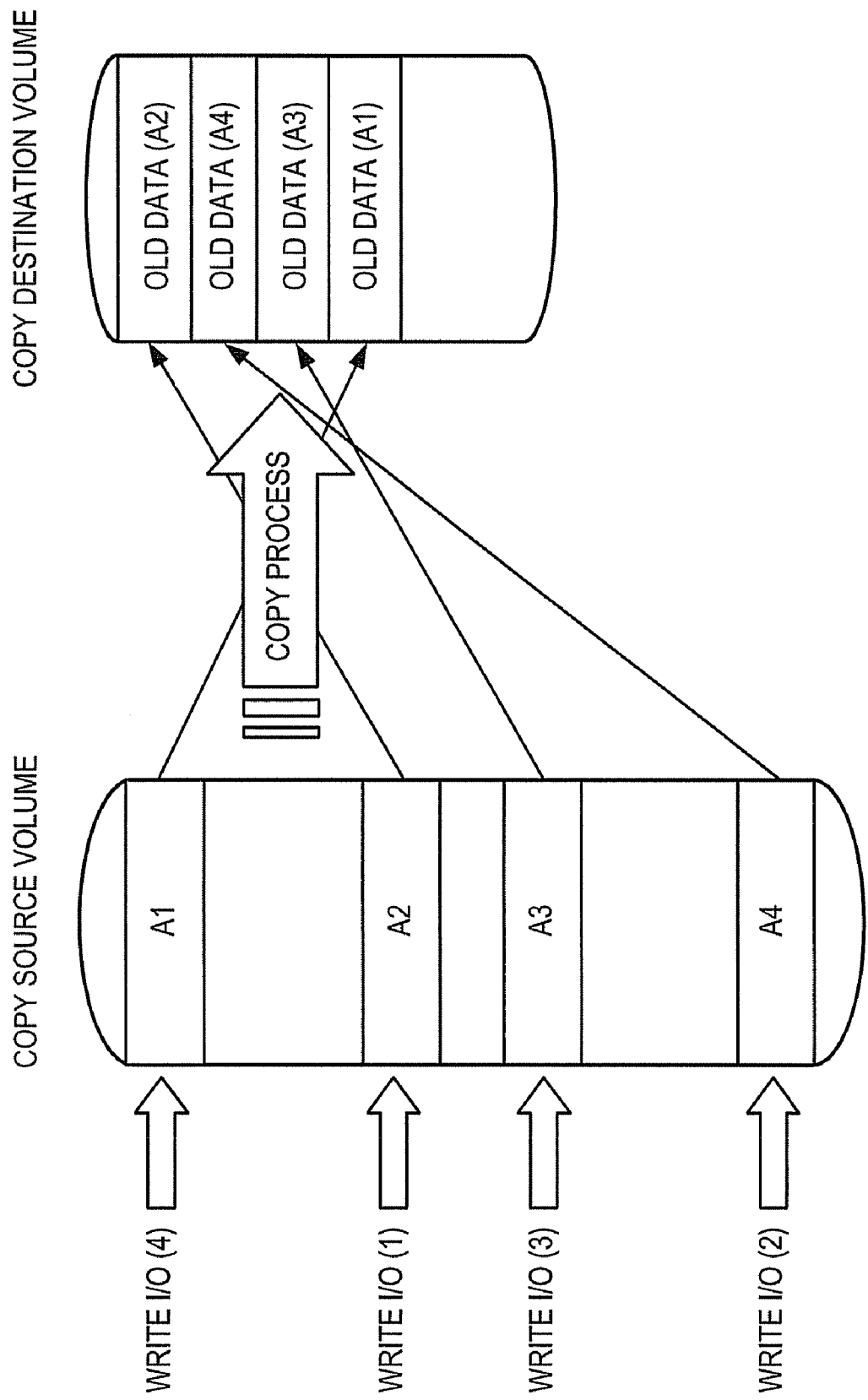
FIG. 11 is an explanatory view for explaining a snapshot forming function in a storage system.
Figure 12:
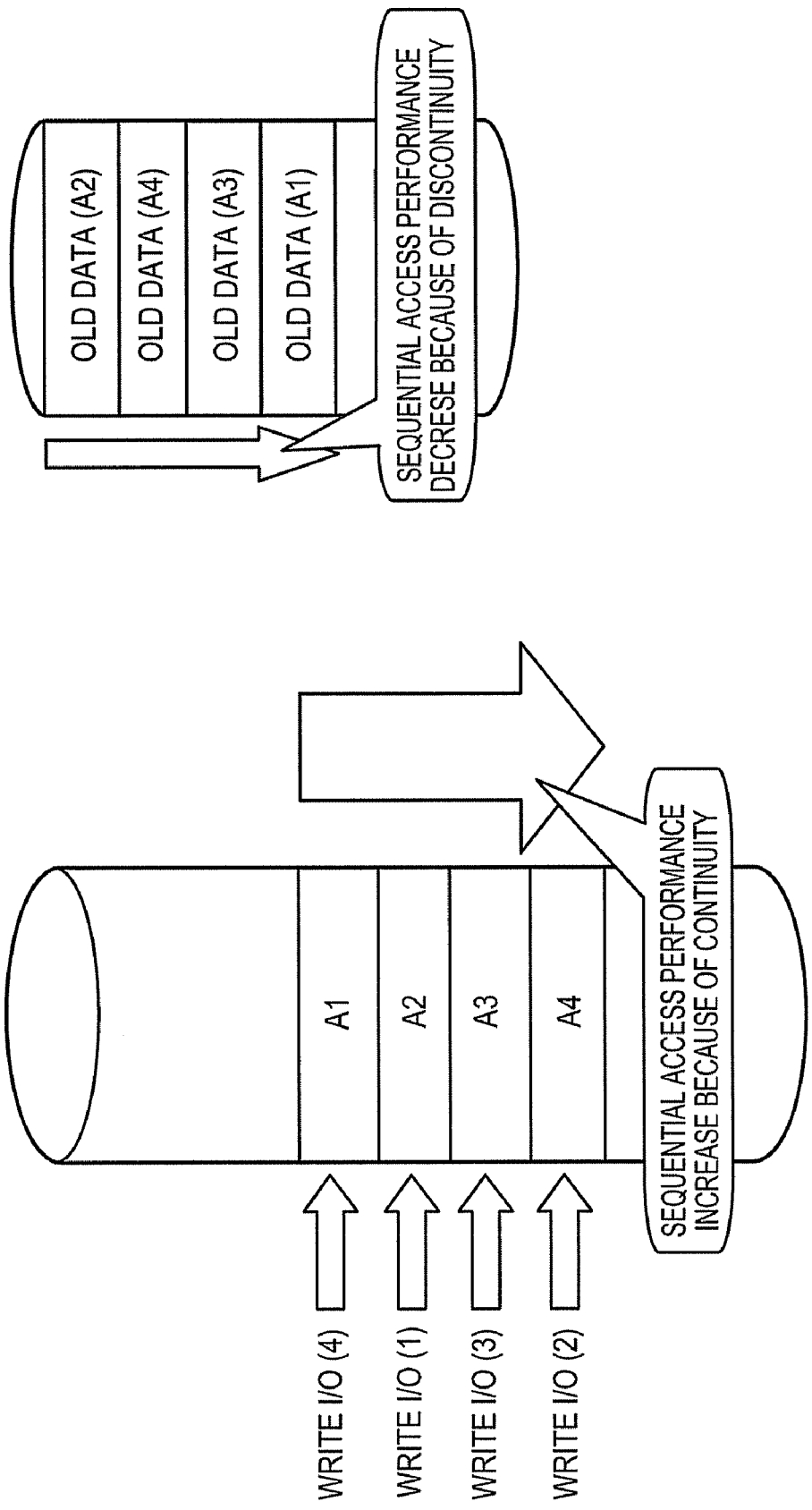
FIG. 12 is an explanatory view for explaining a snapshot forming function in a storage system.

Next, with reference to FIGS. 8 to 10, a description is made of a concrete example of the relocation operation executed by the copy control unit 24, 24a or 24b (specifically, the relocation processing section 33) in the storage system 1 according to an embodiment. Herein, FIG. 8 illustrates data areas in units of offset each of which has become the update target in the copy source volume 13a, and also illustrates the stored data of respective before-update data in units of offset in the copy destination volume (SDV) 13b and the pool area 13c. FIG. 9 illustrates, on the left side, the copy source volume 13a that is the same as shown in FIG. 8, and on the right side, the data areas in units of offset resulting from executing, by the relocation processing section 33, the relocation process on areas (each corresponding to 5 offsets) for which copying of all continuous data has been confirmed by the confirming section 32. FIG. 10 illustrates, on the left side, the copy source volume 13a that is the same as shown in FIG. 8, and on the right side, the data areas in units of offset resulting from executing the relocation process on discrete parts, shown in FIG. 9, by the relocation processing section 33.

In FIGS. 8 to 10, it is assumed that a capacity of the copy destination volume (SDV) 13b corresponds to 8 offsets and an allocation unit (size) of the pool area 13c corresponds to 5 offsets. In such a case, continuity information corresponding to 8 offsets (offsets 0-7) in the SDV 13b is managed in the first entry of the continuity management table 313, and continuity information per 5 offsets is managed in each of the second and subsequent entries. Stated another way, continuity information of the offsets 8-12 is managed in the second entry, and continuity information of the offsets 13-17 is managed in the third entry. Regarding the subsequent offsets, continuity information is also managed in a similar manner.

In the example shown in FIG. 8, five pool areas 13c-1 to 13c-5 having a size of the allocation unit per area are added to the copy destination volume (SDV) 13b for forming snapshots. Also, in the example shown in FIG. 9, four pool areas 13c-6 to 13c-9 having a size of the predetermined unit per area are further added for executing the relocation process. In the example shown in FIG. 10, three pool areas 13c-10 to 13c-12 having a size of the allocation unit per area are added for executing the relocation process of the discrete parts.

In FIGS. 8 to 10, each of parenthesized numerals [0] to [42] (corresponding respectively to offsets 0 to 41), which are put on the left side within blocks denoting respective data in units of offset, represents the logical address of the relevant data in the copy source volume 13a. Also, each of not-parenthesized numerals 1 to 32, which are put on the right side within the same blocks, represents the sequence in which the respective data are updated by the host computer 2, i.e., the sequence in which the respective data are transferred from the copy source volume 13a to the SDV side.

It is assumed, as shown on the left side of FIG. 8, that write requests (Write I/O's) are issued from the host computer 2 at random for the continuous data at the logical addresses [0] to [42] of the copy source volume 13a. In such a case, as shown on the right side of FIG. 8, respective before-update data (Old Data) in the data areas in units of offset are written in the copy destination volume (SDV) 13b and the added pool areas 13c-1 to 13c-5 to be sequentially arranged from the top in sequence of updates (i.e., in sequence of transfers) with the snapshot forming function of the copy control unit 24. On the SDV side, therefore, the order of logical addresses of the respective data in units of offset is not kept at all, and 32 data areas (Old Data) are stored in a state scattered as physical areas.

The copy control unit 24 (specifically, the confirming section 32 and the relocation processing section 33) operates in accordance with the flowcharts, shown in FIGS. 5 and 6, on the SDV 13b and the pool areas 13c-1 to 13c-5 which are in the stored state shown on the right side of FIG. 8, whereby data relocation is performed as shown on the right side of FIG. 9.

More specifically, in the stored state on the right side of FIG. 8, continuous data of the offsets 8 to 12 (logical addresses [8] to [12]), continuous data of the offsets 18 to 22 (logical addresses [18] to [22]), and continuous data of the offsets 28 to 37 (logical addresses [28] to [37]) are transferred from the copy source volume 13a to the SDV side. When that stored state is confirmed by the copy control unit 24 (specifically, the confirming section 32) on the basis of the continuity management table 313 (YES route of operation S15 in FIG. 5), not-used pool areas 13c-6 to 13c-9 are acquired (operation S16 in FIG. 5) as shown on the right side of FIG. 9.

When the relocation processing section 33 operates in accordance with the flowchart shown in FIG. 6, the continuous data of the offsets 8 to 12 (logical addresses [8] to [12]), which have been updated and transferred respectively for a sixth, third, twelfth, thirteenth and fourteenth time, are relocated in the pool area 13c-6. Similarly, the continuous data of the offsets 18 to 22 (logical addresses [18] to [22]), which have been updated and transferred respectively for a twenty-third, eighteenth, eighth, thirtieth and fifteenth time, are relocated in the pool area 13c-7. Further, the continuous data of the offsets 28 to 37 (logical addresses [28] to [37]), which have been updated and transferred respectively for a twenty-ninth, thirty-second, twenty-fifth, second, ninth, tenth, twentieth, twenty-first, twenty-fourth and eleventh time, are relocated in the pool areas 13c-8 and 13c-9. With the above-described relocation process, the pool area 13c-1 comes into an empty state, i.e., a not-used state, and therefore it is released. Additionally, the pool area 13c-9 is newly acquired at the time when the pool area 13c-8 is filled with the continuous data of the offsets 28 to 32 (logical addresses [28] to [32]).

After the above-described relocation process has been executed, a group of data in a discrete state (i.e., discrete parts) remains, as shown on the right side of FIG. 9, in the SDV 13b and the pool areas 13c-2 to 13c-5. Those discrete parts are relocated, as shown on the right side of FIG. 10, by the relocation processing section 33 operating on those discrete parts in accordance with the flowchart shown in FIG. 7 in the low usage hour(s) where the operation load is small.

More specifically, in the example shown in FIG. 9, respective data of the offsets 14, 17, 38 and 4 (logical addresses [14], [17], [38] and [4]), which have been updated and transferred respectively for a first, fourth, fifth and seventh time, remain in the SDV 13b. Similarly, respective data of the offsets 0 and 23 (logical addresses [0] and [23]), which have been updated and transferred respectively for a sixteenth and seventeenth time, remain in the pool area 13c-2, and respective data of the offsets 41 and 26 (logical addresses [41] and [26]), which have been updated and transferred respectively for a nineteenth and twenty-second time, remain in the pool area 13c-3. Further, respective data of the offsets 1, 13 and 27 (logical addresses [1], [13] and [27]), which have been updated and transferred respectively for a twenty-sixth, twenty-seventh and twenty-eighth time, remain in the pool area 13c-4, and data of the offset 7 (logical address [7]), which has been updated and transferred for a thirty-first time, remains in the pool area 13c-5.

With the relocation processing section 33 operating on those discrete parts in accordance with the flowchart shown in FIG. 7, as shown on the right side of FIG. 10, three not-used pool areas 13c-10 to 13c-12 are sequentially acquired and the data in the discrete parts are relocated in the pool areas 13c-10 to 13c-12 to be sequentially arranged from the top in increasing order of logical addresses. In more detail, the respective data of the offsets 0, 1, 4, 7 and 13 (logical addresses [0], [1], [4], [7] and [13]), which have been updated and transferred respectively for a sixteenth, twenty-sixth, seventh, thirty-first and twenty-seventh time, are relocated in the pool area 13c-10. Similarly, the respective data of the offsets 14, 17, 23, 26 and 27 (logical addresses [14], [17], [23], [26] and [27]), which have been updated and transferred respectively for a first, fourth, seventeenth, twenty-second and twenty-eighth time, are relocated in the pool area 13c-11. Further, the respective data of the offsets 38 and 41 (logical addresses [38] and [41]), which have been updated and transferred respectively for a fifth and nineteenth time, are relocated in the pool area 13c-12. With the above-described relocation process, the pool areas 13c-2 to 13c-5 come into an empty state, i.e., a not-used state, and therefore they are released. The SDV 13b temporarily comes into an empty state and is held in a standby state for the next relocation of the discrete parts. Additionally, the pool areas 13c-11 and 13c-12 are newly acquired at the time when the pool areas 13c-10 and 13c-11 are filled with the data.

With the storage system 1 of an embodiment, as described above, the update target data (updated locations) having been copied from the copy source volume 13a to the copy destination volume (SDV) 13b are dynamically relocated by the confirming section 32 and the relocation processing section 33 with the aid of the management tables 311 to 313. Stated another way, when snapshots are formed, respective before-update data (Old Data) can be dynamically relocated to be rearranged in order of logical addresses of the copy source volume 13a by utilizing empty areas of the SDV 13b and the pool area 13c. As a result, continuity of data is maintained in the SDV 13b and the sequential access performance is greatly improved, whereby read of target data at a higher speed can be realized.

A control system and method are disclosed herein which include storing a table having information of storage volumes having continuous addresses prior to copying of an update target and dynamically relocating data in a destination volume based on a sequence identified in the table when determining a completion of the copying of the update target from a source volume to the destination volume. Further, as mentioned above, a table is provided that enables a conversion between logical addresses and physical addresses of the storage volumes.

It is to be noted that the present invention is not limited to the above-described embodiment and the present invention can be practiced in variously modified forms within the scope not departing from the gist of the present invention.

For example, the present invention is not limited to the number of various constituent elements, the number of offsets, the unit values, etc. described in the foregoing embodiment.

Also, the functions of the above-described copy control unit 24 (specifically, the confirming section 32 and the relocation processing section 33), the snapshot forming function, and (all or part of) the functions of preparing and updating the management tables 311, 312 and 313 are realized with a computer (including a CPU, an information processing apparatus, and various terminals) executing a predetermined application program.

The program is provided, for example, in the form recorded on a computer-readable recording medium, such as a flexible disk, CD (e.g., CD-ROM, CD-R or CD-RW), DVD (DVD-ROM, DVD-RAM, DVD-R, DVD-RW, DVD+R, DVD+RW or Blu-ray Disc). In such a case, the computer reads the program from the recording medium and transfers it to an internal storage device or an external storage device to be loaded therein for use. Further, the program may be recorded on, e.g., a storage device (recording medium), such as a magnetic disk, an optical disk or a magneto-optical disk, and may be provided from the storage device to the computer via a communication line.

Herein, the term "computer" represents the concept including hardware and an OS (Operating System) and refers to hardware operating under control of the OS. Also, when hardware is operated with the application program alone without using the OS, the hardware corresponds in itself to the computer. The hardware includes at least a microprocessor such as a CPU, and a means for reading a computer program recorded on the recording medium. The above-mentioned program includes program code causing the above-mentioned computer to realize the various functions. Further, a part of those functions may be realized with the OS instead of the application program.

The recording medium used in an embodiment can be selected from among various computer-readable media including, in addition to the above-mentioned flexible disk, CD, DVD, magnetic disk, optical disk, and magneto-optical disk, an IC card, a ROM cartridge, a magnetic tape, a punched card, an internal storage device (memory such as RAM or ROM) in a computer, an external storage device or the like, a print on which a barcode or other code is printed, etc.

Any or all of the operations described herein may be implemented via one or more hardware components. However, the present invention is not limited to any specific implementation of an operation. For example, one or more operations discussed herein may be implemented via software executed on a device while others may be executed via a specific hardware device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A storage system, comprising:
a first storage volume in which data transmitted from a higher-level device is stored;
a second storage volume into which before-update data at updated locations in the first storage volume is copied; and
a control unit for controlling a process of the copying, and the control unit including:
a management table managing the updated locations in the first storage volume and stored locations of the before-update data in the second storage volume,
a confirming section confirming, based on the management table, that data in a predetermined range of the first storage volume has been copied into the second storage volume, and
a relocation processing section relocating, based on a confirmation result, data in the second storage volume such that data at a relocation destination in the second storage volume is rearranged in a sequence of the first storage volume.

2. The storage system according to claim 1, comprising:
a reserve volume allocated to the second storage volume depending on a state of use of the second storage volume, and
wherein the relocation processing section executes the relocation process of data by using the reserve volume.

3. The storage system according to claim 2, wherein the relocation processing section allocates the data in the reserve volume, which has been subjected to the relocation process, to the second storage volume.

4. The storage system as in any one of claims 2 or 3, wherein the relocation processing section executes the relocation process on respective data in the second storage volume, which corresponds to areas where the copying of the data in the predetermined range of the first storage volume is not yet completed, such that the respective data in the second storage volume are arranged in a predetermined sequence.

5. The storage system as in any one of claims 2 or 3, wherein the predetermined range is an allocation unit of the reserve volume.

6. A copy control method for use in copying before-update of update target data in a first storage volume, in which data transmitted from a higher-level device is stored, to a second storage volume, the copy control method comprising:
managing the update target data in the first storage volume and stored locations of the before-update data of the update target data in the second storage volume by using a management table,
confirming, based on the management table, that data in a predetermined range of the first storage volume has been copied into the second storage volume, and
relocating, based on a confirmation result, data in the second storage volume such that data at a relocation destination in the second storage volume is arranged in a sequence of the first storage volume.

7. The copy control method according to claim 6, wherein the relocation processing executes the relocation process of data by using a reserve volume which is allocated to the second storage volume depending on a state of use of the second storage volume.

8. The copy control method according to claim 7, wherein the relocation processing allocates the relocated data in the reserve volume to the second storage volume.

9. The copy control method as in any one of claims 7 or 8, wherein the relocation processing section executes the relocation process on respective data in the second storage volume, which correspond to areas where the copying of the data in the predetermined range of the first storage volume is not yet completed, such that the respective data in the second storage volume are arranged in a predetermined sequence.

10. The copy control method as in any one of claims 7 or 8, wherein the predetermined range is an allocation unit of the reserve volume.

11. A copy control unit for use in copying before-update data of update target data in a first storage volume, in which data transmitted from a higher-level device is stored, to a second storage volume, the copy control unit comprising:
   a management table for managing the update target data in the first storage volume and stored locations of the before-update data of the update target data in the second storage volume,
   a confirming section for confirming, based on the management table, that data in a predetermined range of the first storage volume has been copied into the second storage volume, and
   a relocation processing section for executing, based on a confirmation result, data in the second storage volume such that data at a relocation destination in the second storage volume is rearranged in a sequence of the first storage volume.

12. The copy control unit according to claim 11, wherein the relocation processing section executes the relocation process of data by using a reserve volume which is allocated to the second storage volume depending on a state of use of the second storage volume.

13. The copy control unit according to claim 12, wherein the relocation processing section allocates the relocated data in the reserve volume to the second storage volume.

14. The copy control unit as in any one of claims 12 or 13, wherein the relocation processing section executes the relocation process on respective data in the second storage volume, which correspond to areas where the copying of the data in the predetermined range of the first storage volume is not yet completed, such that the respective data in the second storage volume are arranged in a predetermined sequence.

15. The copy control unit as in any one of claims 12 or 13, wherein the predetermined range is an allocation unit of the reserve volume.

\* \* \* \* \*